(12) United States Patent
Oonishi

(10) Patent No.: US 9,489,074 B2
(45) Date of Patent: Nov. 8, 2016

(54) ELECTRONIC DEVICE, OPERATION CONTROL METHOD, AND OPERATION CONTROL PROGRAM

(75) Inventor: Katsuaki Oonishi, Tokyo (JP)

(73) Assignee: KYOCERA CORPORATION, Kyoto (JP)

( * ) Notice: Subject to any disclaimer, the term of this patent is extended or adjusted under 35 U.S.C. 154(b) by 109 days.

(21) Appl. No.: 14/006,631

(22) PCT Filed: Mar. 23, 2012

(86) PCT No.: PCT/JP2012/057590
§ 371 (c)(1),
(2), (4) Date: Sep. 20, 2013

(87) PCT Pub. No.: WO2012/128361
PCT Pub. Date: Sep. 27, 2012

(65) Prior Publication Data
US 2014/0015784 A1    Jan. 16, 2014

(30) Foreign Application Priority Data

Mar. 23, 2011    (JP) ................................ 2011-064875

(51) Int. Cl.
*G06F 3/041* (2006.01)
*G06F 3/0482* (2013.01)
(Continued)

(52) U.S. Cl.
CPC ........... *G06F 3/0412* (2013.01); *G06F 3/0414* (2013.01); *G06F 3/0482* (2013.01); *G06F 3/04883* (2013.01); *H04M 1/72522* (2013.01); *H04M 1/7258* (2013.01); *H04M 2250/22* (2013.01)

(58) Field of Classification Search
CPC .. G06F 3/0412; G06F 3/0414; G06F 3/0482; G06F 3/04883; H04M 1/72522; H04M 1/7258; H04M 2250/22
USPC .................................. 345/170–176; 715/765
See application file for complete search history.

(56) References Cited

U.S. PATENT DOCUMENTS

2006/0279559 A1* 12/2006 Kongqiao et al. ............ 345/179
2007/0270179 A1* 11/2007 Lee et al. ................... 455/550.1
(Continued)

FOREIGN PATENT DOCUMENTS

JP          9-114624 A      5/1997
JP       2002-182833 A      6/2002
(Continued)

OTHER PUBLICATIONS

Office Action mailed Aug. 5, 2014, corresponding to Japanese patent application No. 2013-506041, for which an explanation of relevance is attached.
(Continued)

*Primary Examiner* — Quan-Zhen Wang
*Assistant Examiner* — Tony Davis
(74) *Attorney, Agent, or Firm* — Hauptman Ham, LLP

(57) ABSTRACT

According to an aspect, an electronic device includes: a display unit; an input unit including an input area; a time detecting unit for detecting an operation time of an input operation performed on the input area; and a control unit for performing a predetermined notification when an input operation is performed on the input area to which a plurality of actions are assigned according to the operation time detected by the time detecting unit.

15 Claims, 6 Drawing Sheets

(51) Int. Cl.
*G06F 3/0488* (2013.01)
*H04M 1/725* (2006.01)

(56) References Cited

U.S. PATENT DOCUMENTS

| | | | |
|---|---|---|---|
| 2009/0013180 A1* | 1/2009 | Li | 713/168 |
| 2009/0027233 A1* | 1/2009 | Li | 341/20 |
| 2009/0244023 A1* | 10/2009 | Kim et al. | 345/173 |
| 2011/0016390 A1* | 1/2011 | Oh | G06F 3/0482 715/702 |
| 2011/0131513 A1* | 6/2011 | Yamamoto | 715/763 |
| 2011/0244844 A1* | 10/2011 | Aoike | 455/418 |
| 2012/0036459 A1* | 2/2012 | Pei | G06F 3/04815 715/765 |
| 2013/0082956 A1* | 4/2013 | Yajima | G06F 1/1626 345/173 |
| 2013/0082959 A1* | 4/2013 | Shimazu | G06F 3/04886 345/173 |
| 2013/0082965 A1* | 4/2013 | Wada | G06F 3/04883 345/173 |
| 2013/0167074 A1* | 6/2013 | Oonishi | G06F 3/0488 715/799 |
| 2014/0015784 A1* | 1/2014 | Oonishi | G06F 3/0412 345/173 |

FOREIGN PATENT DOCUMENTS

| | | |
|---|---|---|
| JP | 200461770 A | 2/2004 |
| JP | 2009-163365 A | 7/2009 |

OTHER PUBLICATIONS

International Search Report and Written Opinion corresponding to PCT/JP2012/057590, dated Jun. 19, 2012.

* cited by examiner

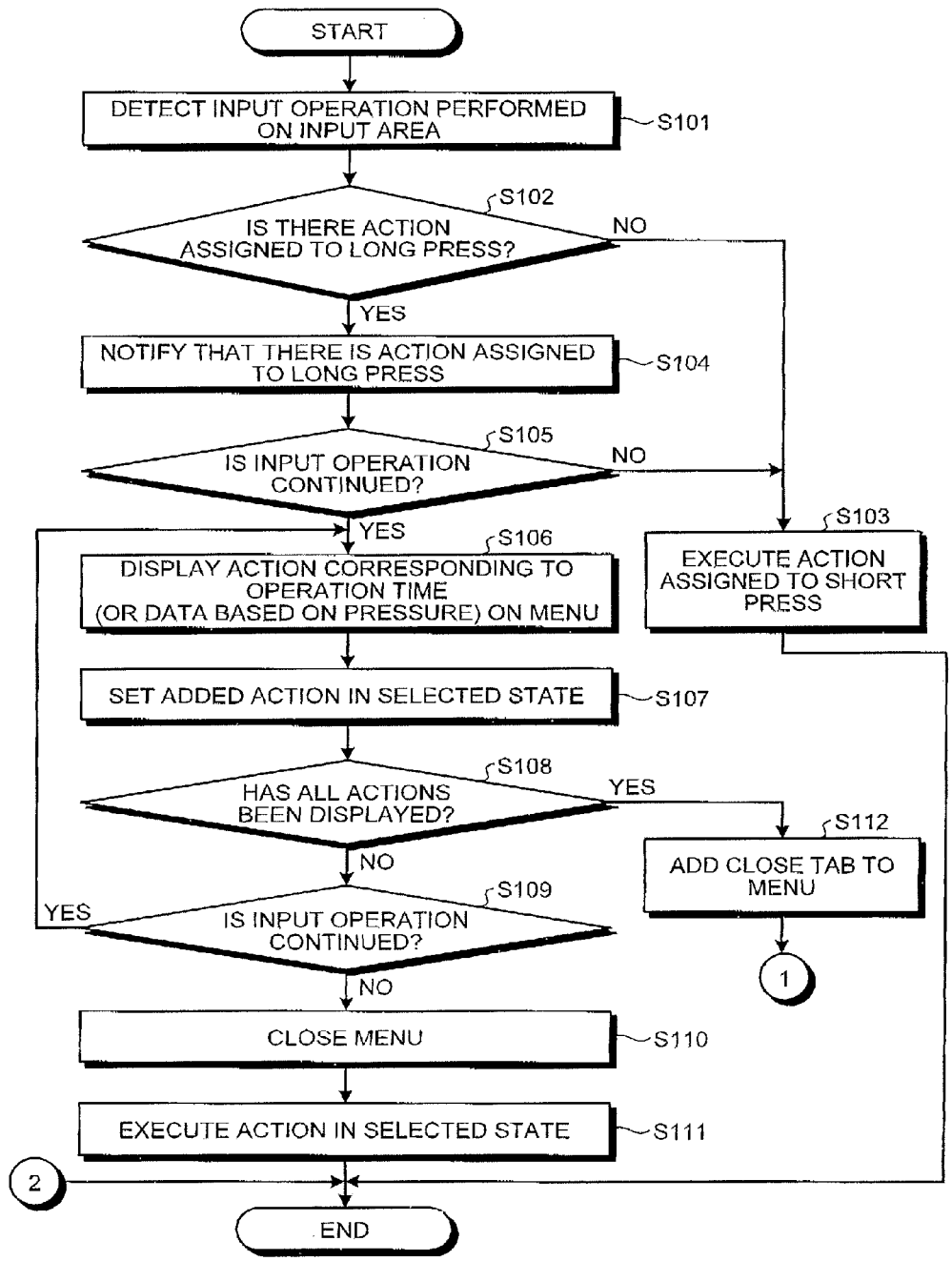

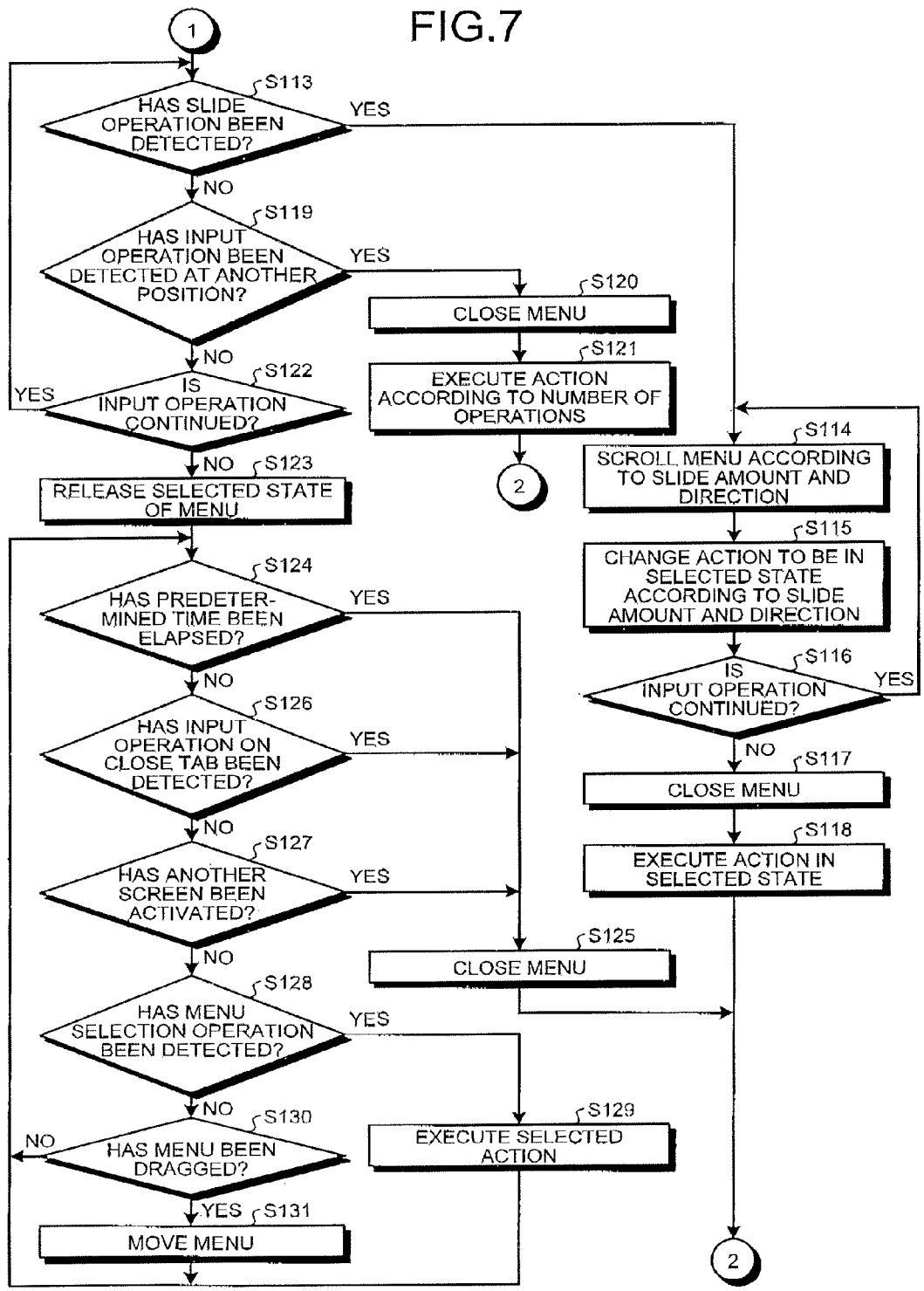

ELECTRONIC DEVICE, OPERATION CONTROL METHOD, AND OPERATION CONTROL PROGRAM

CROSS-REFERENCE TO RELATED APPLICATION

This application is a National Stage of PCT international Application Ser. No. PCT/JP2012/057590 filed on Mar. 23, 2012 which designates the United States, and which is based upon and claims the benefit of priority from Japanese Patent Application No. 2011-064875 filed on Mar. 23, 2011.

FIELD

The present invention relates to an electronic device, an operation control method; and an operation control program.

BACKGROUND

In recent years, miniaturization and high function of electronic devices have been advanced. Therefore, an input unit provided in the electronic device is requested to enable various actions executable corresponding to the high function while being miniaturized. From these background, a plurality of actions corresponding to input operations are assigned to an input area such as an operation key (see, for example, Patent Literature 1).

CITATION LIST

Patent Literature

Patent Literature 1: JP-A-2002-182833

SUMMARY

Technical Problem

One electronic device may include a mixture of an input area assigned with a plurality of actions and an input area assigned with only one action. In this case, it is difficult for a user to determine to which of the input areas the plurality of actions are assigned. Therefore, the user cannot sometimes utilize the plurality of actions assigned to the input area.

For the foregoing reasons, there is a need for an electronic device, an operation control method, and an operation control program by which the user can easily utilize a plurality of actions assigned to an input area.

Solution to Problem

According to an aspect, an electronic device includes: a display unit; an input unit including an input area; a time detecting unit for detecting an operation time of an input operation performed on the input area; and a control unit for performing a predetermined notification when an input operation is performed on the input area to which a plurality of actions are assigned according to the operation time detected by the time detecting unit.

According to another aspect, an electronic device includes: a display unit; an input unit including an input area; a pressure detecting unit for detecting a pressure of an input operation performed on the input area; and a control unit for performing a predetermined notification when an input operation is performed on the input area to which a plurality of actions are assigned according to data based on the pressure.

According to another aspect, an operation control method, which is executed by an electronic device that includes an input area, includes: detecting an input operation performed on the input area; determining whether a plurality of actions are assigned to the input area, on which where the input operation is detected, according to an operation time of the input operation or according to data based on a pressure thereof; and performing a predetermined notification when the plurality of actions are assigned to the input area on which the input operation is detected.

According to another aspect, an operation control program causes an electronic device that includes an input area to execute: detecting an input operation performed on the input area; determining whether a plurality of actions are assigned to the input area, on which where the input operation is detected, according to an operation time of the input operation or according to data based on a pressure thereof; and performing a predetermined notification when the plurality of actions are assigned to the input area on which the input operation is detected.

Advantageous Effects of Invention

The present invention enables the user to easily utilize a plurality of actions assigned to an input area.

BRIEF DESCRIPTION OF DRAWINGS

FIG. 6 is a flowchart illustrating a processing procedure of the control related to the long press.

FIG. 7 is a flowchart illustrating a processing procedure after a menu is displayed in response to the long press.

DESCRIPTION OF EMBODIMENTS

The present invention will be explained in detail below with reference to the drawings. It should be noted that the present invention is not limited by the following explanation. In addition, the components in the explanation below include those which are easily thought of by persons skilled in the art, those which are substantially identical, and those in a scope of so-called equivalents. In the following, a mobile phone is used for explanation as an example of an electronic device; however, the application target of the present invention is not limited to the mobile phones. Therefore, the present invention is also applicable to, for example, PHSs (Personal Handyphone Systems), PDAs, portable navigation devices, notebook computers, and gaming devices.

Embodiments

Figure 1:
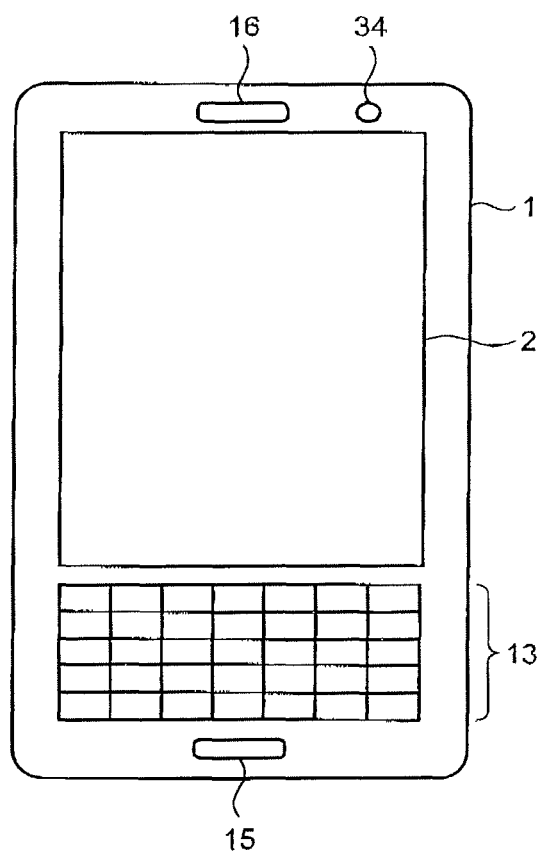
FIG. 1 is a front view illustrating an appearance of a mobile phone (electronic device) according to an embodiment.
Figure 2:
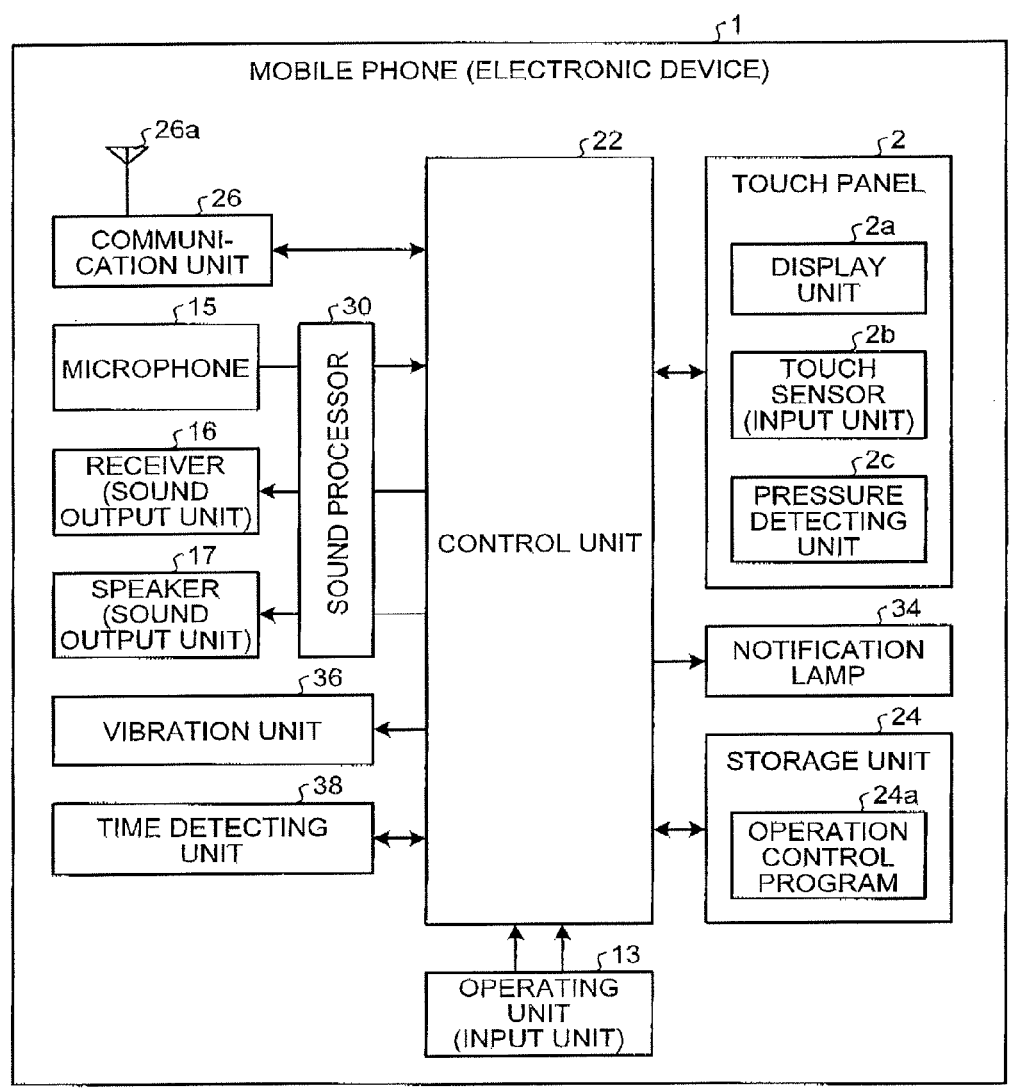
FIG. 2 is a block diagram illustrating a functional configuration of the mobile phone according to the embodiment.

First of all, a configuration of a mobile phone (electronic device) 1 according to the present embodiment will be explained below with reference to FIG. 1 and FIG. 2. FIG. 1 is a front view illustrating an appearance of the Mobile phone 1. FIG. 2 is a block diagram illustrating a functional configuration of the mobile phone 1.

As illustrated in. FIG. 1 and FIG. 2, the mobile phone 1 includes a touch panel 2, an operating unit 13, a microphone 15, a receiver 16, a speaker 17, a control unit 22, a storage unit 24, a communication unit 26, a sound processor 30, a notification lamp 34, a vibration unit 36, and a time detecting unit 38. Each part of the touch panel 2, the operating unit 13, the microphone 15, the receiver 16, and the notification lamp 34 is exposed to the front face of the mobile phone 1.

The touch panel 2 displays various types of information such as characters, graphics, and images, and detects an input operation performed on a predetermined area such as displayed icon, button, and character input area. The touch panel 2 includes a display unit 2a, a touch sensor 2b as one of input units, and a pressure detecting unit 2c which are overlaid on one another in a predetermined order.

The display unit 2a is provided with a display device such as an LCD (Liquid Crystal Display) or an OEL (Organic Electro-Luminescence) panel, and displays various types of information according to a control signal input from the control unit 22. The touch sensor 2b detects an input operation performed on the surface of the touch panel 2, and outputs a signal corresponding to the detected input operation to the control unit 22. The method in which the touch sensor 2b detects an input operation may be any method such as a capacitive type method and a pressure sensitive type method.

The pressure detecting unit 2c detects a pressure on the touch Sensor 2b, and is configured by using, for example, a strain gauge sensor or an element such as a piezoelectric element, whose physical or electrical properties (strain, resistance, voltage, etc.) change according to the pressure. For example, when the pressure detecting unit 2c is configured by using the piezoelectric element or the like, the piezoelectric element of the pressure detecting unit 2c changes in the magnitude of voltage (voltage value) being electrical properties according to the magnitude of a load (force) (or a speed (acceleration) at which the magnitude of a load (force) changes) connected to the pressure on the touch sensor 2b. The pressure detecting unit 2c notifies (outputs) the magnitude of the voltage (voltage value (hereinafter, "data")) to the control unit 22. When the pressure detecting unit 2c notifies (outputs) the data to the control unit 22 or when the control unit 22 detects the data related to the piezoelectric element of the pressure detecting unit 2c, the control unit 22 acquires (detects) the data. That is, the control unit 22 acquires (detects) the data based on the pressure on the touch sensor 11. In other words, the control unit 22 acquires (detects) the data based on the pressure from the pressure detecting unit 2c. The data based on the pressure is not limited to a value representing strain, resistance, voltage, or the like, and may also a value representing the load (force). When the detection method of the touch sensor 2b is a pressure sensitive type, the touch sensor 2b may also serve a function of the pressure detecting unit 2c. The touch panel 2 is not necessarily provided with the pressure detecting unit 2c.

The operating unit 13 has various buttons such as input keys for inputting characters and numbers, direction keys for changing a selection target, and function keys for activating a specific function such as telephone call and menu display. The operating unit 13 functions as an input unit for detecting an input operation and outputs a signal corresponding to the pressed button to the control unit 22. In the present embodiment, the buttons provided in the operating unit 13 are assumed to be configured so that at least one of color and brightness of their surfaces can be changed by controlling a light source such as LED (Light Emitting Diode) embedded in the back side.

The microphone 15 acquires an external sound. The receiver 16 is one of sound output units, and outputs voice of the other party on the phone. The speaker 17, which is another one of the sound output units, outputs music, sound effect, and the like. The receiver 16 may also serve a function of the speaker 11. The sound processor 30 converts the sound input from the microphone 15 to a digital signal and outputs the digital signal to the control unit 22. The sound processor 30 decodes the digital signal input from the control unit 22 and outputs the decoded signal to the receiver 16 or to the speaker 17.

The communication unit 26 has an antenna 26a, and establishes a wireless signal path using a CDMA (Code Division Multiple Access) system or so with a base station via a channel allocated by the base station, thereby performing telephone communication and information communication with other device through the base station.

The notification lamp 34 has a light source such as LED, and emits the light source according to the control signal input from the control unit 22. The notification lamp 34 is used to notify the user of various events such as an incoming call, an incoming mail, and an alarm, and is controlled so as to emit light in a different flashing pattern or color according to a content to be notified.

The vibration unit 36 generates vibration by driving a motor or a piezoelectric element or the like according to the control signal input from the control unit 22. The vibration unit 36 is used to notify the user of various events, and is controlled so as to vibrate in a different vibration pattern or strength according to a content to be notified. The time detecting unit 38 detects an elapsed time based on a reference clock or the like.

The control unit 22 includes a CPU (Central Processing Unit) being a processing unit and a memory being, a storage unit, and implements various functions by executing programs using these hardware resources. Specifically, the control unit 22 reads a program or data stored in the storage unit 24 to load it to the memory, and causes the CPU to execute instructions included in the program loaded to the memory. The control unit 22 performs read/write of data from/to the memory and the storage unit 24 and controls operations of the communication unit 26, the display unit 2a, and the like according to the results of the instructions executed by the CPU. When the CPU executes instructions, the data loaded to the memory and the signal input from the touch sensor 2b or so are used as part of parameters and determination conditions.

The storage unit 24 is formed from a nonvolatile storage device such as a flash memory, and stores therein various programs and data. The program stored in the storage unit 24 includes an operation control program 24a. The operation control program 24a may be acquired from any other device such as a server through wireless communication performed by the communication unit 26. The storage unit 24 may be configured by combining a portable storage medium such as a memory card with a reader/writer for reading/writing data from/to the storage medium. In this case, the operation control program 24a may be stored in the storage medium.

The operation control program 24a provides various functions related to input operations performed on the input unit, i.e. the touch panel 2 and the operating unit 13. The function provided by the operation control program 24a includes a function related to a long press. The mobile phone 1 may have a case in which action(s) (function) different from that assigned to a short press in an input area is assigned to the long press therein.

The input area mentioned here means a component such as each of buttons provided in the operating unit 13 or a button or a character input area displayed on the touch panel 2. The long press means an input operation continuously performed on the same input area for a predetermined operation time or more, or an input operation with a predetermined pressure or more performed on the same input area (with which data based on the pressure acquired by the control unit 22 becomes a predetermined value or more.)

Although assignment of actions to, the long press is useful in order to provide various functions to the user, the actions are not necessarily assigned to the long press in all the input areas. Because of this, even if the actions are assigned to the long press, the user sometimes cannot notice that. Therefore, the operation control program 24*a* provides a function that allows the user to learn in which input area an action is assigned to the long press and in which input area no action is assigned to the long press while the user is preforming usual operations. By providing such a function, the user can easily recognize the action assigned to the long press and utilize the functions of the mobile phone 1.

The operation control program 24*a* further provides a function for easily selecting any of actions assigned to the long press. By providing such a function, the user can further easily utilize the functions of the mobile phone 1.

Figure 3:
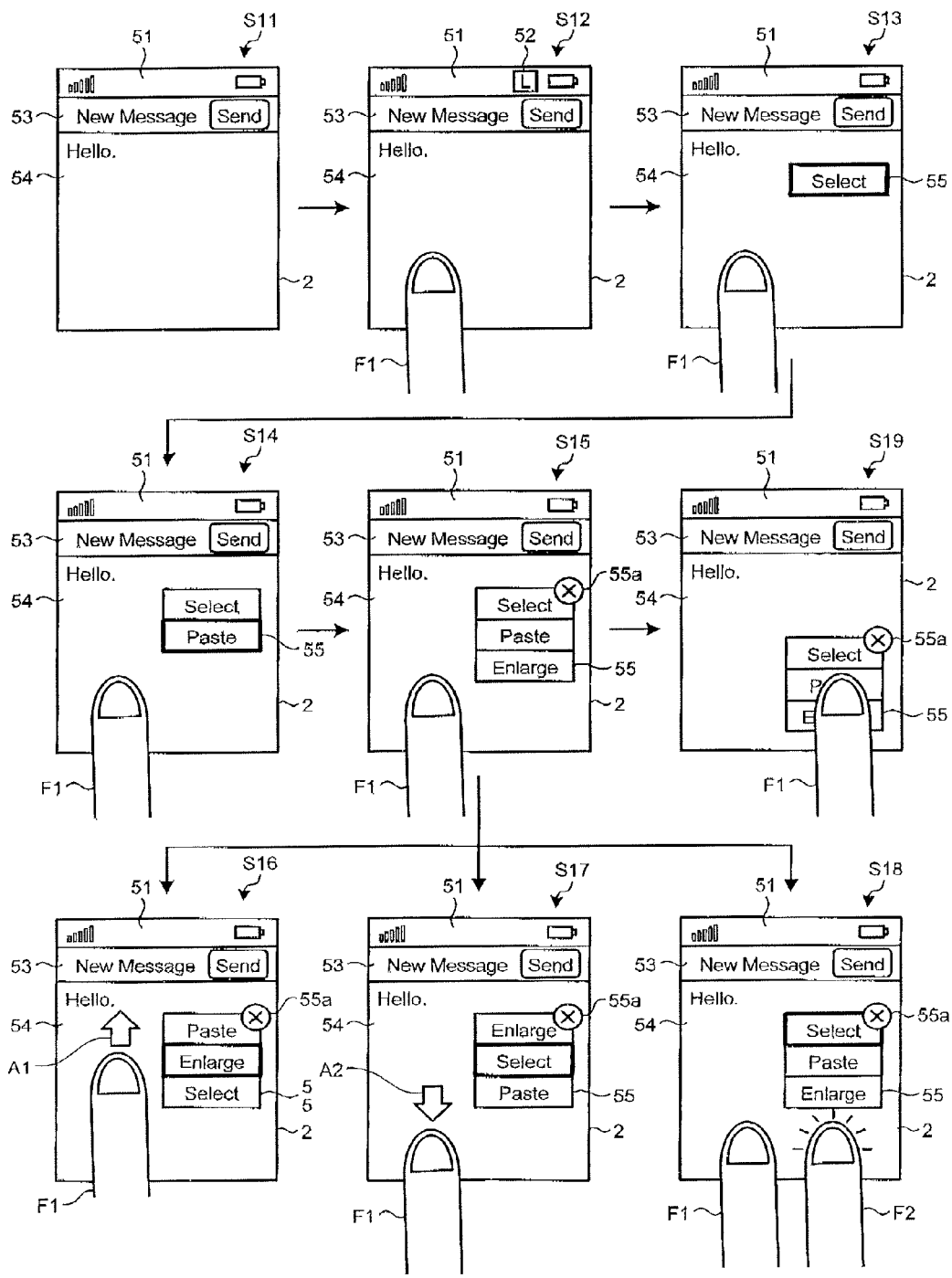
FIG. 3 is diagrams illustrating an example of a control related to a long press on an input area on a touch panel.
Figure 4:
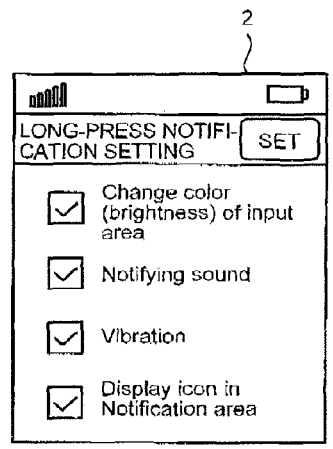
FIG. 4 is a diagram illustrating an example of a long-press notification setting screen.
Figure 5:
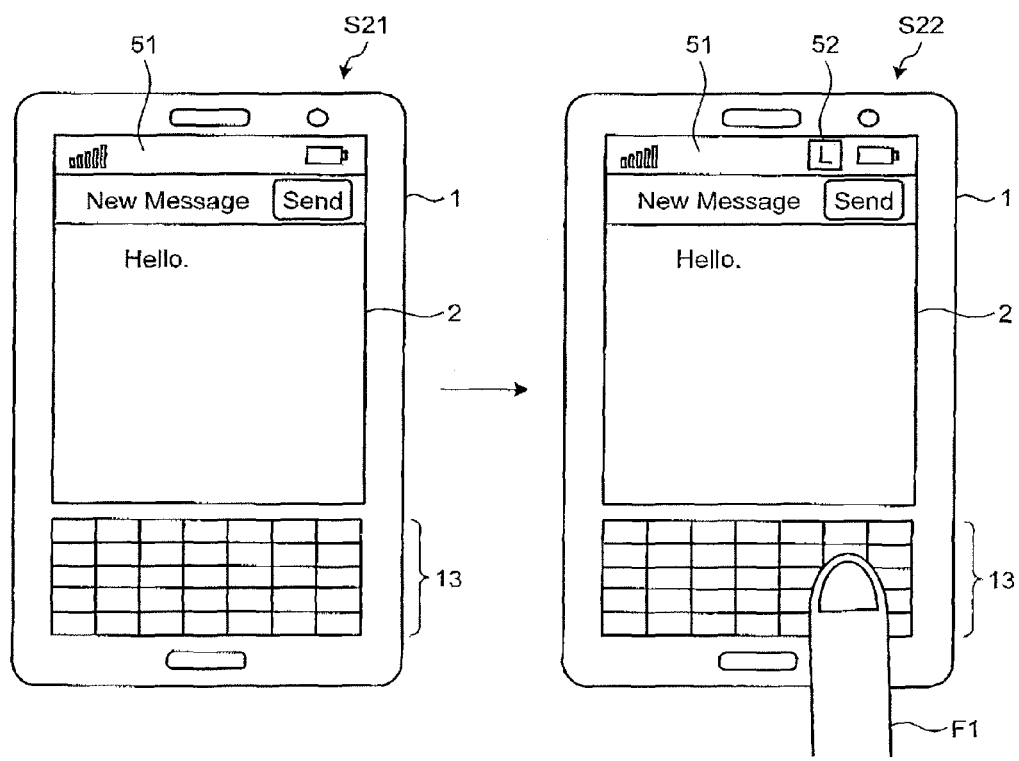
FIG. 5 is a diagram illustrating an example of a control related to a long press on a button in an operating unit.

Then the functions related to the long press provided by the operation control program 24*a* will be explained in more detail below with reference to FIG. 3 to FIG. 5. FIG. 3 is diagrams illustrating an example of a control related to the long press on an input area on the touch panel 21. FIG. 4 is a diagram illustrating an example of a long-press notification setting screen. FIG. 5 is a diagram illustrating an example of a control related to the long press on a button in the operating unit 13.

At Step S11 in the example of FIG. 3, a new message edit screen for editing a message to be sent by an, electronic mail function is displayed on the touch panel 2. The new message edit screen includes a header 53 including a send button to execute transmission of an electronic mail and a character input area 54 being an input area used to edit the message. A plurality of actions are assigned to the long press in the character input area 54. A notification area 51 for displaying a radio field strength, a remaining battery level, or the like is provided along the upper end of the touch panel 2.

As illustrated at Step S12, the user is assumed to bring a finger F1 into contact with the touch panel 2 inside of the character input area 54. The motion of bringing the finger F1 into contact with the touch panel 2 is one of input operations. In this way, when any input operation is performed in an input area the control unit 22 determines whether an action is assigned to the long press in the input area. If an action is assigned to the long press, then the control unit 22 notifies the user accordingly.

In the case of the example illustrated in FIG. 3, the action is assigned to the long press in the character input area 54, and therefore the control unit 22 displays a notification icon 52 in the notification area 51 in order to notify the user accordingly. The notification icon 52 is deleted after a given period of time is elapsed. In this way, by displaying the notification icon 52 according to any input operation performed on the character input area 54, the user can learn that the long press on the character input area 54 enables an action different from usual actions to be executed.

The example of displaying the notification icon 52 in the notification area 51 is represented here in order to notify the user that an action is assigned to the long press; however, the way of notification, is not limited to this method. For example, as illustrated in FIG. 4, as a notification method in the case in which an action is assigned to the long press, a method of changing at least one of the color or the brightness of the input area, a method of outputting a notifying sound from the receiver 16 or the speaker 17, or a method of causing the vibration unit 36 to generate vibration, or the like, may be employed. One or more of the methods may be employed according to user's setting.

When the user brings the finger F1 into contact with the touch panel 2 inside the character input area 54 and then releases the finger F1 from the touch panel 2 within a given period of time, the control unit 22 executes an action assigned to the short press in the character input area 54.

Meanwhile, when the user keeps the finger F1 in continuous contact with it, as illustrated at Step S13 to Step S15, the control unit 22 sequentially displays, among the actions assigned to the long press in the character input area 54, one action corresponding to the operation time after another on the touch panel 2, in association with each operation time detected by the time detecting unit 38. In other words, each of the actions assigned to the long press is associated with an operation time set according to a priority thereof and they are displayed in order from the action whose corresponding operation time is elapsed.

Each of the actions to be displayed becomes one of options to be selected in a menu 55. In the menu 55, the last displayed action is set in a selected state, and when the user releases the finger F1 from the touch panel 2 before all the actions are displayed, the control unit 22 executes the action in the selected state at that time and closes the menu 55. By performing the control in this manner, the user can select a desired action and execute the action without moving the finger F1 to the menu 55.

In this example, the actions are displayed one after another on the touch panel 2 in association with each operation time; however, the actions may be displayed one after another OR the touch panel 2 in association with the pressure of an input operation (data based on the pressure acquired by the control unit 22). In other words, each of the actions assigned to the long press may be associated with data based on the pressure set according to the priority thereof and one action corresponding to the data based on the pressure acquired by the control unit 22 may be displayed after another.

When many actions are assigned to the long press, an upper limit number of actions to be simultaneously displayed may be determined, and when the actions to be displayed exceed the upper limit number, then the actions may be hidden one by one in the order of their displays each time one action is displayed. In this way, by limiting the number of actions to be simultaneously displayed, the display area of the touch panel 2 can be effectively utilized for any purpose other than the display of the menu 55.

When the display of all the actions is completed, the control unit 22 adds a close tab 55*a* to the menu 55 as illustrated at Step S15.

As illustrated at Step S16, when the user slides the finger F1 upward (direction of arrow A1) without releasing it from the touch panel 2 after the display of all the actions is complete, the control unit 22 cyclically scrolls the actions displayed in the menu 55 upward according to a slide amount. At this time, the control unit 22 sets one of the actions displayed in the menu 55 in a selected state. The action set in the selected state is sequentially changed according to a scroll amount. When the user releases the finger F1 from the touch panel 2, the control unit 22 executes the action in the selected state at that time and closes the menu 55. This control allows the user to select a desired action and execute the action without moving the finger F1 to the menu 55.

Likewise, as illustrated at Step S17, when the user slides the finger F1 downward (direction of arrow A2) without releasing it from the touch panel 2, the control unit 22 cyclically scrolls the actions displayed in the menu 55 downward according to a slide amount. At this time, the control unit 22 sets one of the actions displayed in the menu 55 in a selected state. The action set in the selected, state is sequentially changed according to a scroll amount. When the user releases the finger F1 from the touch panel 2, the control unit 22 executes the action in the selected state at that time and closes the menu 55. If the user changes the direction of the slide operation, then the control unit 22 synchronously changes the scroll direction.

As illustrated at Step S18, when the user performs one or more input operations on the character input area 54 using another finger F2 while keeping the finger F1 in contact with the touch panel 2, the control unit 22 executes the action according to the number of input operations performed by the another finger F2. For example, the number of input operations using the another finger F2 and an action to be executed are previously associated with each other in such a manner that a first action in the menu 55 is executed when the input operation using the another finger F2 is detected once within a given time and a second action is executed when it is detected twice, and the control unit 22 executes the action based on the association. This control alloys the user to select a desired action and execute the action without moving the finger F1 to the menu 55.

After the addition of the close tab 55a to the menu 55, when the input operations illustrated at Step S16, Step S17, and Step S18 are not detected, the menu 55 is displayed as it is even if the user releases the finger F1 from the touch panel 2. When the user performs a selection operation on one of the actions included in the menu 55, the control unit 22 executes the action on which the selection operation is performed. Alternatively when the input operation on the close tab 55a is detected, the control unit 22 closes the menu 55.

It is preferable that the menu 55 is displayed as it is even after the selection operation on one of the actions included in the menu 55 is detected and the action is executed. This control allows the user to easily select a desired action from among the actions assigned to the long press without performing a comparatively troublesome operation such as the long press.

When the user performs a drag operation on the menu 55 as illustrated at Step S19 after the close tab 55a is added to the menu 55, the control unit 22 moves the menu 55 following the drag operation. The drag operation mentioned here is an operation such that the user brings the finger F1 into contact with the touch panel 2 in the display area of the menu 55 and moves the finger F1 as if the menu 55 is dragged while keeping the contact. This control allows the user to move the menu 55 to any-position that does not cause an obstruction.

When the number of actions to be simultaneously displayed in the menu 55 is limited, the actions displayed in the menu 55 may be cyclically scrolled according to the direction of a flick operation on the menu 55. The flick operation is an input operation such that the finger is brought into contact with the touch panel 2 for a short time and is then moved in one direction at high speed as if something is flicked.

The case in which the actions are assigned to the long press in the input area on the touch panel 2 has been explained with reference to FIG. 3; however, in the case in which the actions are assigned to the button in the operating unit 13, the control unit 22 also performs the same control.

At Step S21 in the example of FIG. 5, a new message edit screen for editing a message to be sent by an e-mail function is displayed. The notification area 51 for displaying the radio field strength, the remaining battery level, or the like is provided along the upper end of the touch panel 2.

As illustrated at Step S22, it is assumed herein that the user performs an input operation to press one of the buttons in the operating unit 13 with the finger F1. In this way, when any input operation is performed on the button in the operating unit 13, the control unit 22 determines whether an action is assigned to the long press on the button. When an action is assigned to the long press on the button, then the control unit 22 notifies the user accordingly.

In the case of the example illustrated in FIG. 5, because an action is assigned to the long press on the button pressed by the finger F1, the control unit 22 displays the notification icon 52 in the notification area 51 in order to notify the user accordingly. The notification icon 52 is deleted after a given time is elapsed. In this way, by displaying the notification icon 52 according to any input operation performed on the button, the user can learn that the long press on the button enables an action different from usual actions to be executed.

If the user continuously performs the input operation to press the button with the finger F1, then, similarly to the cases at Step S13 to Step S15 in FIG. 3, the control unit 22 may display, among the actions assigned to the long press, one action corresponding to the operation time after another on the touch panel 2, in association with an operation time detected by the time detecting unit 38. When the user releases the finger F1 from the button, the control unit 22 may execute the action in the selected state at that time.

Then a processing procedure of the Control related to the long press and performed by the control unit 22 will be explained below with reference to FIG. 6 and FIG. 7. FIG. 6 is a flowchart illustrating a processing procedure of the control related to the long press. FIG. 7 is a flowchart illustrating a processing procedure after the menu is displayed in response to the long press. The processing procedures illustrated in FIG. 6 and FIG. 7 are implemented by the control unit 22 executing the operation control program 24a. The processing procedure of the control related to the long press on the input area on the touch panel 2 will be explained below; however, the control related to the long press on the button in the operating unit 13 can be implemented by excluding a processing procedure related to an input operation specific to the touch panel from the processing procedure.

At Step S101, when an input operation on an input area is detected, then at Step S102, the control unit 22 determines whether there is an action assigned to the long press in the input area. When there is no action assigned to the long press (No at Step S102), then at Step S103, the control unit 22 executes an action assigned to the short press in the input area. When there is no action assigned to the long press, it may be configured that the control unit 22 measures a continuous time of the input operation or data based on the pressure thereof and executes no action if the input operation corresponds to the long press.

When there is an action assigned to the long press (Yes at Step S102), then at Step S104, the control unit 22 notifies the user accordingly in a preset method. At Step S105, the control unit 22 determines whether the input operation is continued for a predetermined time or more. When the input operation is not continued for a predetermined time or more (No at Step S105), then at Step S103, the control unit 22 executes the action, assigned to the short press in the input area.

Meanwhile, when the input operation is continued for a predetermined time or more (Yes at Step S105), then at Step S106, the control unit 22 additionally displays an action corresponding to the operation time or the data based on the pressure at that time, of the actions assigned to the long press, on the menu 55. Then at Step S107, the control unit 22 sets the additionally displayed action in a selected state.

Subsequently, at Step S108, the control unit 22 determines whether all the actions assigned to the long press have been displayed. When not all the actions are displayed (No at Step S108), then at Step S109, the control unit 22 determines whether the input operation is continued. When the input operation is continued (Yes at Step S109), the control unit 22 re-executes Step S106 and the subsequent steps to additionally display other action on the menu 55.

Meanwhile, when the input operation is not continued, that is, when the finger has separated from the touch panel 2 before all the actions are displayed (No at Step S109), then at Step S110, the control unit 22 closes the menu 55. At Step S111, the control unit 22 executes the action that had been set in the selected state and ends the processing procedure.

When all the actions assigned to the long press have been displayed at Step S108 (Yes at Step S108), then at Step S112, the control unit 22 adds the close tab 55a to the menu 55. In this way, after the menu 55 is fully displayed, the processing procedure illustrated in FIG. 7 is executed.

After the menu 55 is fully displayed, at Step S113, the control unit 22 determines whether a slide operation has been detected. When a slide operation has been detected (Yes at Step S113), then at Step S114, the control unit 22 cyclically scrolls the actions displayed in the menu 55 according to a slide amount and a slide direction of the slide operation. At Step S115, the control unit 22 changes an action to be in a selected state in the menu 55 according to a slide amount and a slide direction of the slide operation.

At Step S116, the control unit 22 determines whether the input operation is continued. When the input operation is continued (Yes at Step S116), the control unit 22 re-executes Step S114 and the subsequent steps. When the input operation is not continued, that is, when the sliding finger has separated from the touch panel 2 (No at Step S116), then at Step S117, the control unit 22 closes the menu 55. At Step S118, the control unit 22 executes the action that had been set in the selected state and ends the processing procedure.

When a slide operation has not been detected at Step S113 (No at Step S113), then at Step S119, the control unit 22 determines whether an input operation has been detected at another position different from the position where the input operation has been detected at Step S101. When an input operation has been detected at another position (Yes at Step S119), then at Step S120, the control unit 22 closes the menu 55. At Step S121, the control unit 22 executes the action according to the number of input operations detected at the position and ends the processing procedure.

When an input operation has not been detected at another position at Step S119 (No at Step S119), then at Step S122, the control unit 22 determines whether the input operation is continued. When the input operation is continued (Yes at Step S122), the control unit 22 re-executes Step S113 and the subsequent steps.

When the input operation is not continued, that is, when the finger has separated from the touch panel 2 (No at Step S122), then at Step S123, the control unit 22 releases the selected state of the menu 55. At Step S124, the control unit 22 determines whether a predetermined time has been elapsed. The predetermined time mentioned here is a time preset to automatically close the menu. When the predetermined time has been elapsed (Yes at Step S124), then at Step S125, the control unit 22 closes the menu 55 and ends the processing procedure.

When the predetermined time has not been elapsed (No at Step S124), then at Step S126, the control unit 22 determines whether an input operation on the close tab 55a has been detected. When an input operation on the close tab 55a has been detected (Yes at Step S126), then at Step S125, the control unit 22 closes the menu 55 and ends the processing procedure.

When an input operation on the close tab 55a has not been detected (No at Step S126), then at Step S127, the control unit 22 determines whether another screen has been activated. When another screen has been activated, that is, when an input area where the input operation had been detected at Step S101 is hidden (Yes at Step S127), then at Step S125, the control unit 22 closes the menu 55 and ends the processing procedure.

When another screen has not been activated (No at Step S127), then at Step S128, the control unit 22 determines whether a selection operation on the menu 55 has been detected. When a selection operation has been detected (Yes at Step S128), then at Step S129, the control unit 22 executes an action selected by the selection operation. Then, the control unit 22 re-executes Step S124 and the subsequent steps.

When the selection operation has not be detected (No at Step S128), then at Step S130, the control unit 22 determines whether a drag operation on the menu 55 has been detected. When the drag operation has been detected (Yes at Step S130), then at Step S131, the control unit 22 moves the menu 55 according to the drag operation and re-executes Step S124 and the subsequent steps. When the drag operation has not been detected (No at Step S130), the control unit 22 re-executes Step S124 and the subsequent steps without moving the menu 55.

As explained above, a mobile phone (an electronic device) according to the present embodiment includes a display unit, an input unit having an input area, a time detecting unit for detecting an operation time of an input operation on the input area, and a control unit for performing a predetermined notification when an input operation is performed on the input area to which a plurality of actions are assigned according to the operation time detected by the time detecting unit.

A mobile phone (an electronic device) according to the present embodiment includes a display unit, an input unit having an input area, a pressure detecting unit for detecting a pressure of an input operation on the input area, and a control unit for performing a predetermined notification when an input operation is performed on the input area to which a plurality of actions are assigned according to data based on the pressure.

An operation control method according to the present embodiment is an operation control method executed by an electronic device having an input area, and includes detecting an input operation on the input area, determining whether a plurality of actions are assigned to the input area, on which the input operation is detected, according to an operation time of an input operation or data based on a pressure thereof, and performing a predetermined notification when the plurality of actions are assigned to the input area on which the input operation is detected.

An operation control program according to the present embodiment causes an electronic device having an input area to execute detecting an input operation on the input area, determining whether a plurality of actions are assigned to the input area, on which the input operation is detected, according to an operation time of the input operation or data based on a pressure thereof, and performing a predetermined notification when the plurality of actions are assigned to the input area on which the input operation is detected.

According to the configurations, when the user performs an input operation on an input area and if a plurality of actions are assigned to the input area, then a notification is made. Therefore, the user can learn to which input area the plurality of actions are assigned during usual operations.

The control unit preferably displays information, in association with an operation time detected by the time detecting unit, indicating an action corresponding to the operation time on the display unit as the predetermined notification. The control unit also preferably displays information, in association with data based on the pressure, indicating an action corresponding to the data based on the pressure on the display unit as the predetermined notification.

According to the configurations, the user can visually recognize the assignment of a plurality of actions to the input area.

The control unit may change at least one of color and brightness of the input area where the input operation is performed, as the predetermined notification. The mobile phone (electronic device) according to the present embodiment may further include a sound output unit for outputting a sound, and the control unit may cause the sound output unit to output a sound as the predetermined notification. The mobile phone (electronic device) according to the present embodiment may further include a vibration unit for generating vibration, and the control unit may cause the vibration unit to generate vibration as the predetermined notification.

According to the configurations, it is possible to notify the user that a plurality of actions are assigned to an input area in a user recognizable manner.

The input area may be configured to detect an input operation on a predetermined area in the display unit.

According to this configuration, even when a plurality of actions are assigned to a button or the like displayed on the touch panel, the user can recognize the assignment.

When a slide operation in a predetermined direction is detected in the input area to which a plurality of actions are assigned according to input operations, the control unit may display pieces of information corresponding to the plurality of actions on the display unit and select any one of the pieces of the information according to a slide amount of the slide operation. In this case, the control unit may change an order in which the pieces of the information, is selected, according to a direction of the slide operation. In addition, the control unit may cyclically scroll the pieces of the information according to a slide amount of the slide operation.

When another input operation is detected while detecting an input operation in the input area to which a plurality of actions are assigned according to input operations, the control unit may execute any one of the plurality of actions according to the number of times of the another input operation.

According to the configurations, the user can easily select a desired action from the plurality of actions assigned to the input area with fewer operations.

The aspects of the present invention represented in the embodiment can be arbitrarily modified within a scope that does not depart from the gist of the present invention. For example, the embodiment represents an example of the electronic device that includes the touch panel 2 for displaying a virtual button and the like as an input area and the operating unit 13 including physical buttons as an input area; however, the present invention is also applicable to an electronic device that includes only one of the touch panel 2 and the operating unit 13.

The embodiment is configured to display an action on the menu according to an operation time of an input operation or data based on a pressure thereof no matter how many actions are assigned to the long press. However, if one action is assigned to the long press and when an operation time of the input operation or data based on a pressure thereof reaches a predetermined value or more, the action may be executed without displaying the menu.

The embodiment represents an example of assigning different actions to the short press and to the long press performed on the same input area; however, different actions may be assigned to other input operations performed on the same input area. For example, in a certain input area, an action A may be assigned to the short press, an action B may be assigned to the long press, an action C may be assigned to an upward flick operation, and an action D may be assigned to a downward flick operation.

In this case, when some input operations are performed on the input area, in addition to a notification indicating that the action is assigned to the long press, a notification indicating that the action is assigned to the upward flick operation and a notification indicating that the action is assigned to the downward flick operation may be made. The ways of the notifications (types of icons, types of colors, light emitting patterns, and notifying sounds, etc.) may be changed according to combined patterns of the input operations to which the actions are assigned.

The operation control program 24a represented in the embodiment may be divided into a plurality of modules, or may be integrated with the other programs.

The pressure detecting unit 2c represented in the embodiment can be assumed to be configured in various ways according to a contact detecting type on the touch panel. For example, in a case of a resistive-film type, a magnitude of resistance according to a size of a contact area is associated with a load (force) of the pressure on a touch surface of the touch panel, to thereby enable its configuration without using a strain gauge sensor or a piezoelectric element, or so. Alternatively, in a case of a capacitive type, a magnitude of capacitance is associated with a load (force) of the pressure on a touch surface of the touch panel, to thereby enable its configuration without using a strain gauge sensor or a piezoelectric element, or so.

The vibration unit 36 can be configured by using an arbitrary number of piezoelectric vibrators, by providing a transparent piezoelectric element over the entire surface of the touch panel 2, or by rotating an eccentric motor by one at one cycle of a drive signal. Furthermore, when the pressure detecting unit 2c and the vibration unit 36 are configured by using a piezoelectric element, the piezoelectric element can be shared to also form a pressure detecting unit and vibration unit. It is because the piezoelectric element generates a voltage when a pressure is applied thereto and deforms when a voltage is applied thereto.

REFERENCE SIGNS LIST

1 MOBILE PHONE
2 TOUCH PANEL
2a DISPLAY UNIT
2b TOUCH SENSOR (INPUT UNIT)
2c PRESSURE DETECTING UNIT
13 OPERATING UNIT (INPUT UNIT)
15 MICROPHONE
16 RECEIVER (SOUND OUTPUT UNIT)
17 SPEAKER (SOUND OUTPUT UNIT)
22 CONTROL UNIT
24 STORAGE UNIT
24a OPERATION CONTROL PROGRAM
26 COMMUNICATION UNIT
30 SOUND PROCESSOR
34 NOTIFICATION LAMP
36 VIBRATION UNIT
38 TIME DETECTING UNIT

The invention claimed is:

1. An electronic device, comprising:
a display unit;
an input unit including an input area;
a time detecting unit configured to detect an operation time of an input operation performed on the input area; and
a control unit configured to,
when an input operation is performed on the input area where a plurality of actions are assigned,
perform a predetermined notification according to the operation time detected by the time detecting unit and before accepting any of the plurality of actions, wherein the predetermined notification indicates that the plurality of actions are assigned on the input area, and
when an input operation is performed on the input area where the plurality of actions are not assigned,
accept, without performing the predetermined notification, an action assigned on the input area where the plurality of actions are not assigned,
wherein
the control unit is configured to cause the display unit to display, as the predetermined notification, information which is associated with the operation time detected by the time detecting unit and indicates an action corresponding to the operation time,
the information includes a plurality of information pieces corresponding to a plurality of different operation times associated with the plurality of actions, and
the control unit is configured to cause the information pieces to sequentially appear one after another on the display unit in accordance with the corresponding operation times and the detected operation time of the input operation in such a manner that an information piece appears on the display unit when the operation time corresponding to a previous information piece is elapsed, wherein the information pieces sequentially appear one after another and are displayed in a cumulative manner on the displayed unit such that more than one of the information pieces are simultaneously displayed on the display unit, continuing the previous information pieces being displayed on the display unit.

2. The electronic device according to claim 1, wherein the control unit is configured to change at least one of color and brightness of the input area where the input operation is performed, as the predetermined notification.

3. The electronic device according to claim 1, further comprising a sound output unit configured to output a sound, wherein
the control unit is configured to cause the sound output unit to output a sound as the predetermined notification.

4. The electronic device according to claim 1, further comprising a vibration unit configured to generate vibration, wherein
the control unit is configured to cause the vibration unit to generate vibration as the predetermined notification.

5. The electronic device according to claim 1, wherein the input area is configured to detect an input operation on a predetermined area of the display unit.

6. The electronic device according to claim 5, wherein, when a slide operation in a predetermined direction is detected in the input area to which the plurality of actions are assigned according to input operations,
the control unit is configured to
display the pieces of information corresponding to the plurality of actions on the display unit, and
select any one of the pieces of the information according to a slide amount of the slide operation.

7. The electronic device according to claim 6, wherein the control unit is configured to change, according to the direction of the slide operation, an order in which the pieces of the information are selected.

8. The electronic device according to claim 6, wherein the control unit is configured to cyclically scroll the pieces of the information according to the slide amount of the slide operation.

9. The electronic device according to claim 1, wherein, when a second input operation is detected while detecting a first input operation in the input area to which the plurality of actions are assigned according to input operations,
the control unit is configured to execute any one of the plurality of actions according to the number of times the second input operation is detected.

10. The electronic device according to claim 1, wherein the last displayed information piece is set in a selected state, and
the control unit is configured to execute the action associated with the information piece set in the selected state when the input operation is released.

11. The electronic device according to claim 1, wherein the control unit is configured to perform a common notification, as the predetermined notification, in response to any input operation performed on the input area where the plurality of actions are assigned.

12. An electronic device, comprising:
a display unit;
an input unit including an input area;
a pressure detecting unit configured to detect a pressure of an input operation performed on the input area; and
a control unit configured to,
when an input operation is performed on the input area where a plurality of actions are assigned,
perform a predetermined notification according to data based on the pressure and before accepting any of the plurality of actions, wherein the predetermined notification indicates that the plurality of actions are assigned on the input area, and
when an input operation is performed on the input area where the plurality of actions are not assigned,
accept, without performing the predetermined notification, an action assigned on the input area where the plurality of actions are not assigned, wherein
the control unit is configured to cause the display unit to display, as the predetermined notification, information which is associated with the data based on the pressure and indicates an action corresponding to the data based on the pressure,
the information includes a plurality of information pieces corresponding to a plurality of different pressure levels associated with the plurality of actions, and
the control unit is configured to cause the information pieces to sequentially appear one after another on the display unit in accordance with the corresponding pressure levels and the detected pressure of the input operation, wherein the information pieces sequentially appear one after another and are displayed in a cumulative manner on the displayed unit such that more than one of the information pieces are simultaneously displayed on the display unit, continuing the previous information pieces being displayed on the display unit.

13. The electronic device according to claim 12, wherein the last displayed information piece is set in a selected state, and
the control unit is configured to execute the action associated with the information piece set in the selected state when the input operation is released.

14. An operation control method executed by an electronic device that includes an input area and a display unit, the operation control method comprising:
detecting an input operation performed on the input area;
when an input operation is performed on the input area where a plurality of actions are assigned,
performing a predetermined notification, before accepting any of the plurality of actions, wherein
the predetermined notification indicates that the plurality of actions are assigned on the input area, and
the predetermined notification is performed according to an operation time of the input operation or according to data based on a pressure of the input operation; and
when an input operation is performed on the input area where the plurality of actions are not assigned,
accepting, without performing the predetermined notification, an action assigned on the input area where the plurality of actions are not assigned,
wherein, in said performing the predetermined notification,
the display unit displays, as the predetermined notification, information which is associated with the operation time of the detected input operation and indicates an action corresponding to the operation time,
the information includes a plurality of information pieces corresponding to a plurality of different operation times associated with the plurality of actions, and
the information pieces sequentially appear one after another on the display unit in accordance with the corresponding operation times and the operation time of the detected input operation in such a manner that an information piece appears on the display unit when the operation time corresponding to a previous information piece is elapsed, wherein the information pieces sequentially appear one after another and are displayed in a cumulative manner on the displayed unit such that more than one of the information pieces are simultaneously displayed on the display unit, continuing the previous information pieces being displayed on the display unit.

15. A non-transitory storage medium that stores an operation control program for causing, when executed by an electronic device that includes an input area and a display unit, the electronic device to execute:
detecting an input operation performed on the input area;
when an input operation is performed on the input area where a plurality of actions are assigned,
performing a predetermined notification before accepting any of the plurality of actions, wherein
the predetermined notification indicates that the plurality of actions are assigned on the input area, and
the predetermined notification is performed according to an operation time of the input operation or according to data based on a pressure of the input operation; and
when an input operation is performed on the input area where the plurality of actions are not assigned,
accepting, without performing the predetermined notification, an action assigned on the input area where the plurality of actions are not assigned,
wherein, in said performing the predetermined notification,
the display unit displays, as the predetermined notification, information which is associated with the operation time of the detected input operation and indicates an action corresponding to the operation time,
the information includes a plurality of information pieces corresponding to a plurality of different operation times associated with the plurality of actions, and
the information pieces sequentially appear one after another on the display unit in accordance with the corresponding operation times and the operation time of the detected input operation in such a manner that an information piece appears on the display unit when the operation time corresponding to a previous information piece is elapsed, wherein the information pieces sequentially appear one after another and are displayed in a cumulative manner on the displayed unit such that more than one of the information pieces are simultaneously displayed on the display unit, continuing the previous information pieces being displayed on the display unit.

* * * * *